United States Patent [19]

Fanner et al.

[11] Patent Number: 4,638,777
[45] Date of Patent: Jan. 27, 1987

[54] PRECHAMBER FUEL CONTROL SYSTEM

[75] Inventors: John C. Fanner, Fridley, Minn.; Warren E. Snyder, Elm Grove, Wis.

[73] Assignee: Dresser Industries, Inc., Dallas, Tex.

[21] Appl. No.: 658,001

[22] Filed: Oct. 5, 1984

[51] Int. Cl.⁴ .......................................... F02M 21/04
[52] U.S. Cl. .................................. 123/277; 123/527
[58] Field of Search ................ 123/1 A, 3, 274, 277, 123/525, 527, 575, 275, 27 GE; 48/180 C, 189

[56] References Cited

U.S. PATENT DOCUMENTS

| | | | |
|---|---|---|---|
| 1,504,322 | 8/1924 | Brush | 123/277 |
| 2,435,659 | 2/1948 | Summers | 123/277 |
| 2,690,741 | 10/1954 | Broderson | 123/265 |
| 2,849,992 | 9/1958 | Stillebroer et al. | 123/277 |
| 3,124,113 | 3/1964 | May et al. | 123/277 |
| 3,650,255 | 3/1972 | McJones | 123/527 |
| 3,960,126 | 6/1976 | Shinoda | 123/527 |
| 4,071,013 | 1/1978 | Thuren et al. | 123/277 |
| 4,140,090 | 2/1979 | Lindberg | 123/265 |
| 4,161,164 | 7/1979 | Mühlberg | 123/525 X |
| 4,449,509 | 5/1984 | Young | 123/527 |
| 4,480,595 | 11/1984 | Hobby et al. | 123/525 X |
| 4,524,730 | 6/1985 | Doell et al. | 123/27 GE |

OTHER PUBLICATIONS

Serve, J. V., "NOx Reduction on Large bore Turbocharged SI Engines", ASME, Mar., 1982, pp. 1-10.

Primary Examiner—Willis R. Wolfe, Jr.

[57] ABSTRACT

The air fuel ratio control systems described for controlling the air fuel mixture being supplied to the prechamber of gaseous fueled, internal combustion engines includes a pressure control regulator that is responsive to inlet manifold pressure to assure that the pressure of the fuel supplied to the prechamber is as desired and includes volume flow control valves arranged in the air conduit and in the fuel conduit for providing the desired air fuel ratio. Further, the system may include controls for providing relatively rich fuel mixtures or fuel only to the prechambers at certain phases of operation of the engine.

10 Claims, 3 Drawing Figures

FIG. I

PRECHAMBER FUEL CONTROL SYSTEM

BACKGROUND OF THE INVENTION

This invention relates generally to fuel control systems for gaseous fueled engines. More particularly, but not by way of limitation, this invention relates to a prechamber fuel control system for turbocharged, gaseous fueled internal combustion engines.

In the past several years, many regulations have been issued pertinent to the substances emitted by stationary engines that are considered pollutants. Such pollutants include non-methane hydrocarbons (NMHC), oxides of nitrogen (NOx), carbon monoxide (CO), and oxides of sulphur (SOx). In spark ignited, natural gas fuel engines the oxides of nitrogen are normally the highest level emittant and therefore the most difficult to reduce.

It has also been found that the primary engine operating parameter that affects the formation of the oxides of nitrogen is the air fuel ratio. Accordingly, it has been the desire of the engine builders to be able to run the engines on as lean a mixture, that is, on as high an air fuel ratio, as is possible.

Aside from emission control, it is highly desirable to increase the air fuel ratio to as high low a point as is effective to reduce the amount of fuel burned and thus make the engine operation more economical. The natural gas fuels burned in the engines are relatively expensive and, in the next few years, such fuels may become in short supply and thus their conservation is essential. The leaner that the engine can be run the less pollutants generated, the less fuel burned, and the more economical the engine operation.

A manuscript entitled "NOx Reduction on Large Bore Turbo-charge SI Engines" was prepared by J. V. Serve and submitted to the ASME headquarters on Nov. 30, 1981. The manuscript goes into substantial detail regarding the various regulations involving the emittants produced by the engines, their cause, and methods of controlling the same. Further, the manuscript discusses use of the prechamber in natural gas engines and gives an example of a schematic diagram illustrating one form of fuel control for prechambers.

As explained in that paper, the fuel supply to the prechambers is controlled as a function of gas manifold pressure. This is accomplished by branching a line off the manifold through a fixed orifice to a smaller manifold running down the engine with take-offs for each individual cylinder head. While this system will function, a more sophisticated system will provide better prechamber combustion and permit more efficient operation of the engine on higher air fuel ratios. In particular, over most of the engine operating range, the performance is improved if the prechamber is supplied with a mixture of air and gas rather than with gas alone and further improved if the proportion of air and gas can be varied for different operating conditions up to and including the use of pure gas for starting and for full load.

U.S. Pat. No. 4,140,090 issued Feb. 20, 1979 to John E. Lindberg describes an engine utilizing a highly combustible fuel and an oxidizer in a precombustion chamber. Another U.S. Pat. No. 2,435,659 issued Feb. 10, 1948 to C. E. Summers describes a liquid fuel engine, such as an automobile engine utilizing a precombustion chamber.

Therefore, the object of this invention is to provide an improved prechamber fuel supply system that reduces the emittants from the engine, increases fuel efficiency, and permits the engine to operate on a higher air fuel ratio.

SUMMARY OF THE INVENTION

This invention then provides an improved prechamber fuel system for a gaseous fueled engine that includes a prechamber for each of a plurality of cylinders. A reciprocating piston is located in each cylinder and a head closes one end of the cylinders with the head, cylinders and pistons forming a plurality of combustion chambers. An intake manifold is connected with each combustion chamber and with a source of combustion air and of fuel gas. Each prechamber has an ignition device located therein. The improvement comprises a prechamber manifold that is connected with each of the prechambers and includes a conduit that connects the prechamber manifold with the source of combustion air and with the source of pressurized fuel gas. A flow control in the conduit controls the ratio of air and fuel gas and a pressure control device in the conduit located downstream of the flow control device regulates the pressure of the mixed fuel gas and air relative to the pressure in the intake manifold.

BRIEF DESCRIPTION OF THE DRAWING

The foregoing and additional objects and advantages of the invention will become more apparent as the following detailed description is read in conjunction with the accompanying drawing wherein like reference characters denote like parts in all views and wherein.

DETAILED DESCRIPTION OF THE EMBODIMENT OF FIG. 1

Figure 1:
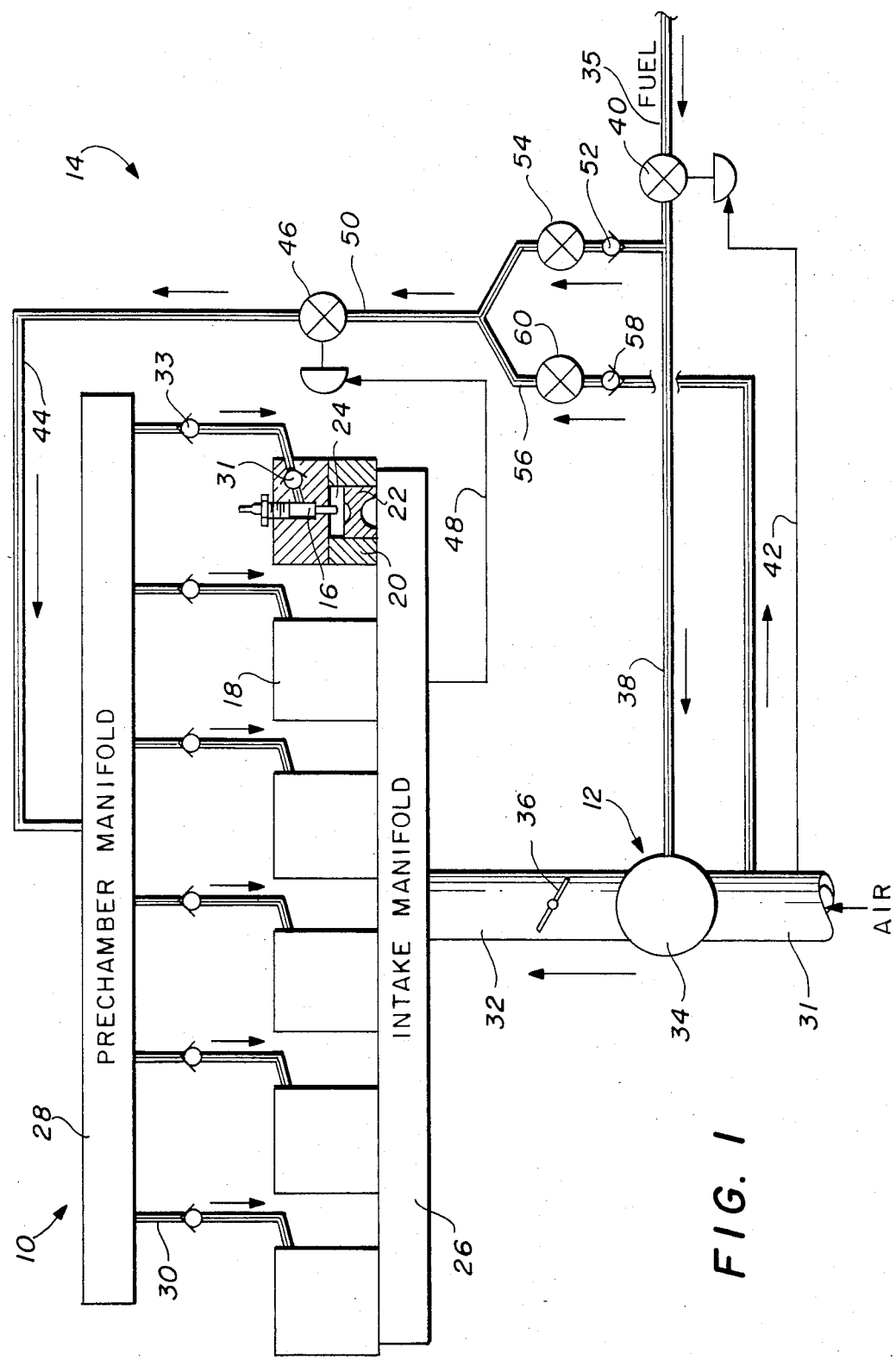
FIG. 1 is a schematic diagram showing one embodiment prechamber fuel system that is constructed in accordance with the invention.

Referring to the drawing and to FIG. 1 in particular, shown therein and generally designated by the reference character 10 is a spark ignited, gaseous fueled, internal combustion engine that is provided with a fuel air mixture from a carburetion system 12 and that includes a prechamber fuel system, generally designated by the reference character 14 for providing fuel to prechambers 16 that are located in the cylinder head 18 of the engine 10.

Although not illustrated, the engine 10 includes one of the prechambers 16 for each cylinder 20. Each of the cylinders 20 also includes a reciprocating piston 22. The cylinders 20, piston 22 and head 18 combine to form a combustion chamber 24 in each of the cylinders of the engine 10. The engine 10 also includes an intake manifold 26 that is connected with each of the combustion chambers 24.

A prechamber manifold 28 is connected with each of the prechambers 16 through conduits 30. Each of the conduits 30 includes a pair of check valves 31 and 33 that permit flow from the prechamber manifold 28 into the prechambers 16 but prevent flow from the prechambers 16 into the conduits 30. Thus, not only is the fuel that is delivered from the prechamber manifold 28 into the prechambers 16 prevented from flowing in the reverse direction, but any flame front or high pressure that may be generated in the combustion chambers 24 and prechambers 16 is prevented from flowing into the prechamber manifold 28.

The intake manifold 26 is connected to a source of combustion air and, preferably, with a turbo-charger (not shown) by a conduit 31. A carburetor 34 is connected to the conduit 31 and, between the carburetor 34 and the intake manifold 26 in a conduit 32 there is located a throttle 36. The throttle is generally governor controlled to maintain the engine speed. The carburetor 34 can be hand or electronically controlled to adjust the desired air fuel ratio.

The carburetor 34 is provided with gaseous fuel through fuel supply conduits 35 and 38. Disposed between the conduit 35 and 38 is a main fuel pressure regulator 40 that controls the pressure in the conduit 38 according to the air pressure in the conduit 32 through a sensing line 42.

The prechamber manifold 28 is provided with either fuel or fuel air mixture through a connecting conduit 44 that is connected to a pressure regulator 46. The pressure regulator 46 is connected to the intake manifold 26 by a sensing line 48. Accordingly, the regulator 46 has an output that varies in accordance with variations in the intake manifold pressure. The regulator 46 is adjusted so that the pressure in the conduit 44 downstream of the regulator 46 is intake manifold pressure or greater.

A conduit 50 is connected with the fuel supply conduit 38 and has a check valve 52 located therein to prevent flow from a conduit 56 toward the fuel conduit 38 while permiting flow from the fuel conduit 38 toward the prechamber manifold 28.

A volume control valve 54 is located in the conduit 50 between the check valve 52 and the pressure regulator 46. The branch conduit 56 extends from a connection with the conduit 50 to the conduit 31 upstream of the carburetor 34. Thus, the conduit 56 is subjected to the pressure of air in the intake manifold conduit 31 and from the turbocharger, if a turbocharger is utilized. The conduit 56 also includes a check valve 58 that permits flow from the conduit 31 toward the prechamber manifold 28 while preventing flow in the reverse direction from conduit 50.

A volume flow control valve 60 is located in the conduit 56 between the check valve 58 and the pressure regulator 46. By manipulating the volume flow control valves 54 and 60, the ratio of the air fuel mixture flowing into the prechamber manifold 28 can be controlled.

From the foregoing, it will be appreciated that the prechamber fuel control system 14 can be utilized to set the air fuel ratio of the mixture reaching the prechamber manifold 28 and the prechamber 16 and can be controlled to provide either a rich or a relatively lean fuel-air mixture for combustion therein. It will also be noted that the pressure of the mixture reaching the prechamber manifold is maintained at not less than the pressure in the intake manifold 26 by the regulator 46.

Thus, the system described supplies one level of air to fuel ratio to the prechambers while supplying a different and preferrably very lean air fuel ratio through the carburetor 34 to the intake manifold 26 of the engine 10. Accordingly, ignition can occur in the prechambers 16 with a relatively rich mixture and thus ignite a relatively lean mixture in the combustion chambers 24. Complete ignition and burning of the fuel occurs in the combustion chamber 24 despite the relatively high air to fuel ratio being utilized.

DETAILED DESCRIPTION OF THE EMBODIMENT OF FIG. 2

Figure 2:
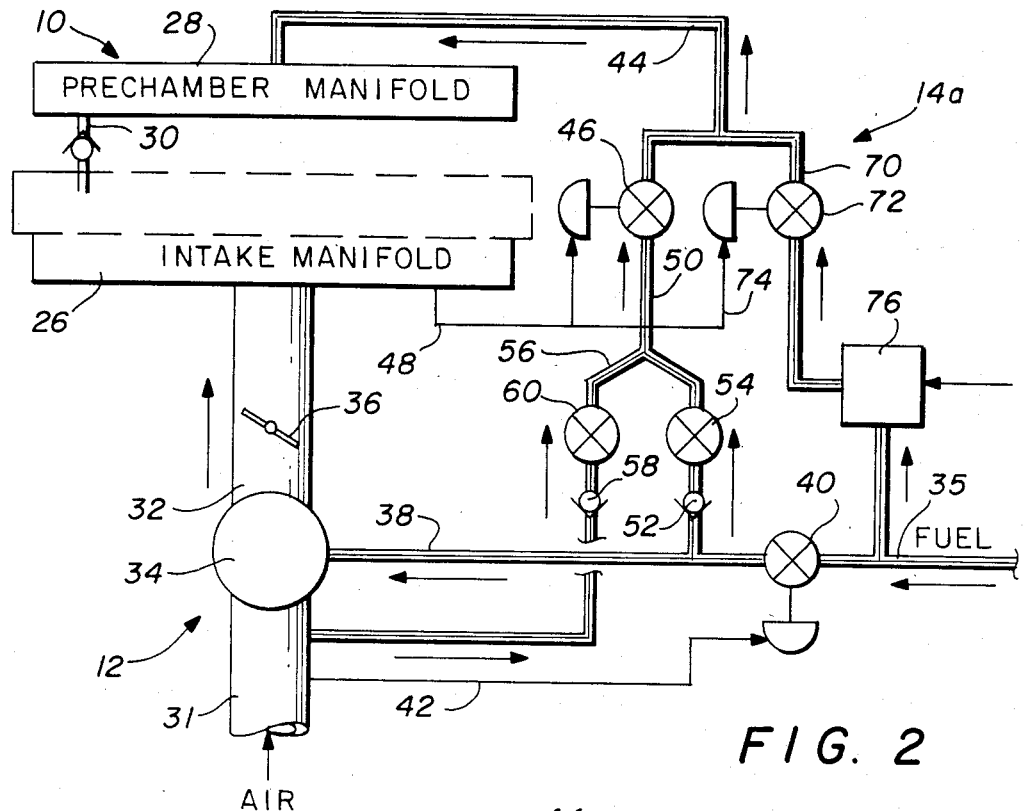
FIG. 2 is a schematic diagram illustrating another embodiment of prechamber fuel system that is also constructed in accordance with the invention.

In the embodiment of FIG. 2, the engine 10 and carburetion system 12 are identical to that previously described in connection with the embodiment of FIG. 1. The prechamber fuel control system has been modified slightly and will be indicated by the reference character 14a. However, those components that are identical to the components previously described in connection with FIG. 1 will be designated by the same reference characters.

As previously described in connection with the embodiment of FIG. 1, the prechamber manifold conduit 44 is connected to the regulator 46 which is connected by the conduit 50 with the fuel supply conduit 38. Branch conduit 56 extends from the conduit 50 into connection with the intake conduit 31. It will be noted that the regulator 46 is connected by conduit 48 with the intake manifold 26 and is thus controlled by the intake manifold pressure.

In the embodiment of FIG. 2, a branch fuel conduit 70 extends from connection with the conduit 44 to the fuel supply conduit 35 upstream of the main regulator 40. Interposed in the conduit 70 is a pressure regulator 72 that is connected to the conduit 48 by a branch conduit 74 so that the pressure regulator 72 also has an output that is relative to the intake manifold pressure. The pressure regulator 72 is set so that its pressure is slightly lower than the output pressure of the regulator 46 for reasons that will be described hereinafter. Also interposed in the conduit 70 is a starting system 76 for the engine 10.

At the start up of the engine 10, fuel is supplied through the conduit 70 via system 76 and the pressure regulator 72 to the prechamber manifold 28 and the prechambers 16 of the engine 10 simultaneously with the introduction of an air fuel mixture through the carburetion system 12 to the intake manifold 26. At this time, the fuel supplied to the prechamber 16 is fuel only and thus provides a very rich mixture to enhance the starting capabilities of the engine 10. As soon as the engine 10 has started, with the turbocharger (not shown) running, pressure is applied through the carburetion system so that the pressure of the fuel air mixture being supplied through the conduit 50 to the regulator 46 exceeds the pressure in the branch conduit 70. Therefore, the mixture flowing through the prechamber manifold conduit 44 is a fuel gas mixture of the desired ratio. Fuel no longer flows though the regulator 72 because the greater pressure in the conduit 44 prevents flow therethrough. The higher pressure in the branch conduit 70 downstream of the regulator 72 feeds back into the regulator 72 shutting off flow through that regulator. Thus, only the mixed fuel and air flowing through the conduit 50 reaches the conduit 44.

Further, during operation of the engine 10 near full throttle, the pressure loss across the carburetion system 12 decreases and may decrease to the point that supply pressure in conduit 50 to the regulator 46 drops below the pressure in the branch conduit 70. When this occurs, fuel only again flows through regulator 72 and the conduits 44 and 70 to the prechamber manifold 28.

As will be appreciated, the embodiment of FIG. 2 is somewhat similar to the embodiment of FIG. 1 except adding the fuel only flow control for the prechambers.

It has been found that upon starting and at full throttle where the pressure differential across the carburetor 34 is relatively low, fuel only supplied to the prechamber 16 provides a more stable combustion.

DETAILED DESCRIPTION OF THE EMBODIMENT OF FIG. 3

Figure 3:
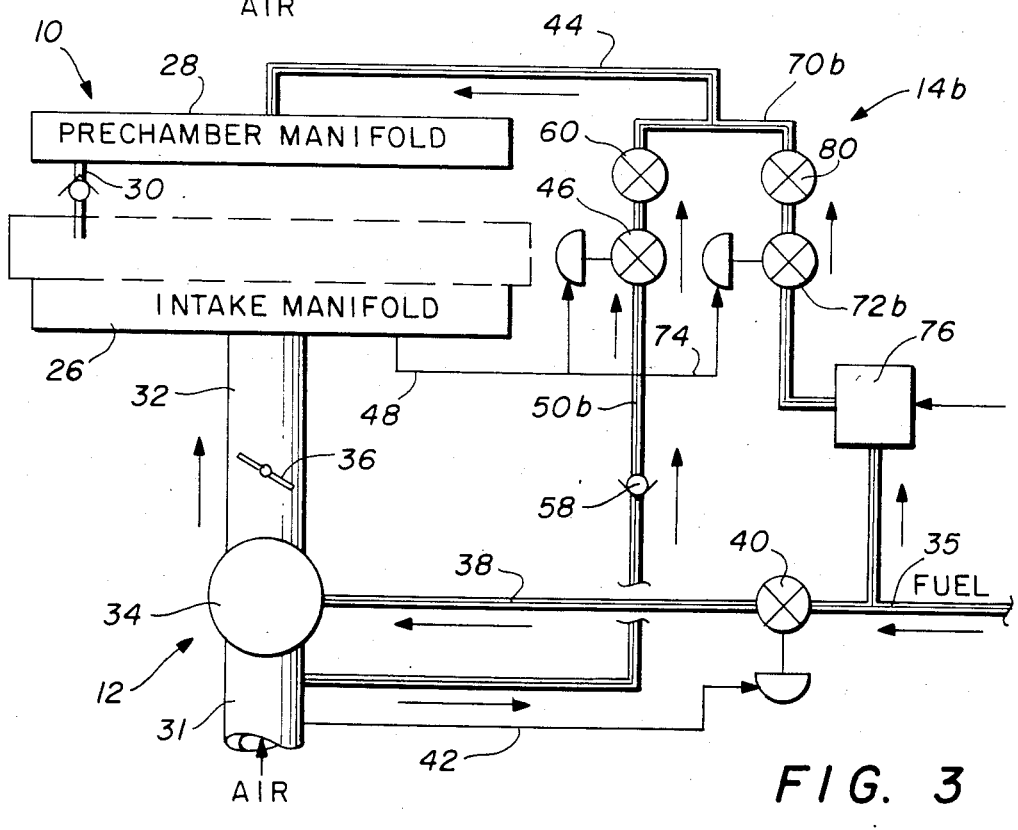
FIG. 3 is an additional schematic diagram that illustrates a modified form of the prechamber fuel system illustrated in FIG. 2.

The prechamber fuel system of FIG. 3 is designated generally by the reference character 14b and is somewhat similar to the prechamber fuel system 14a described in connection with FIG. 2 in that it is possible with the system 14b to provide fuel only to the prechamber manifold. Those components that are the same in FIGS. 2 and 3 will be designated by the same reference characters utilized in the description of FIG. 2.

As shown in FIG. 3, the prechamber manifold 28 is connected by the conduit 44 with the pressure regulator 46 which is controlled by the intake manifold pressure through the conduit 48. The pressure regulator 46 is connected by conduit 50b with the intake conduit 31. It will be noted that the volume flow control valve 60 has been moved in FIG. 3 to a position downstream of the pressure regulator 46 instead of upstream of the regulator 46 as in FIGS. 1 and 2. It will also be noted that there is no fuel conduit provided upstream of the pressure regulator 46 therefore, there will be no mixing of fuel and combustion air ahead of the pressure regulator 46.

A branch conduit 70b connects with the conduit 44 and extends to the starting system 76 and from there to the fuel supply conduit 35 upstream of the main regulator 40. A pressure regulator 72b, which is set at the same pressure as the regulator 46, is interposed in the branch conduit 70b and has its sensing line 74 connected with the intake manifold 26 through the conduit 48. Downstream of the pressure regulator 72b there is positioned a volume flow control valve 80.

The operation of the system 14b is similar to that of the systems 14 and 14a. However, it will be noted now that the fuel flow in the branch conduit 70b and the combustion air flow in the conduit 44 are regulated by the volume flow control valves 60 and 80. Thus, the air-fuel mixture flowing into the prechamber manifold 28 is determined by the regulation or relative setting of the flow control vavles 60 and 80. The pressures of the fuel and air are controlled by the regulators 72b and 46, respectively, which are controlled relative to intake manifold pressure.

Upon start up of the engine 10, fuel only flows through the branch conduit 70b into the prechamber manifold 28 through the conduit 44 since the pressure in the intake conduit 31 has not increased to a point at which significant air flows though the regulator 46. Therefore, the prechamber manifold 28 and the prechambers 16 are receiving gaseous fuel only for the initial start up of the engine 10.

As the engine 10 starts and the turbocharger, if used (not shown), comes up to speed, pressure increases in the intake conduit 31 providing adequate flow through the conduit 50b and the regulator 46 so that the pressure in the conduit 44 reaches the level of the pressure in the branch conduit 70b and mixing occurs between the combustion air and the gaseous fuel. Therefore, the proper air fuel ratio is provided to the prechamber manifold 28.

The systems described in detail hereinbefore, are each capable of reducing the emmission of pollutants from a gaseous fueled engine. Such systems provide a more efficient engine since the systems carefully control the air fuel ratio entering the prechambers to promote more complete and stable combustion of the fuel in the combustion chambers of the engine and, therefore, leaner mixtures can be used. It should be understood that the foregoing embodiments, which are described in detail, are presented by way of example only and many changes and modifications can be made thereto without departing from the spirit or scope of the invention.

What is claimed is:

1. An improved method of fuel control for a gaseous fueled internal combustion engine that includes a prechamber for each of a plurality of combustion chambers, an ignition system for igniting the fuel, and an intake manifold connected with each combustion chamber, the improved method comprising the steps of: supplying fuel gas to the prechambers at a pressure not less than intake manifold pressure;
simultaneously supplying a fuel gas and air mixture to the combustion chambers;
igniting the gas in said prechambers to ignite the gas and air mixture in said combustion chamber;
supplying a fuel gas and air mixture to said prechambers at a pressure higher than the pressure of the fuel gas initially supplied thereby stopping flow of fuel gas alone to said prechambers;
varying the pressure of said fuel gas and air mixture in accordance with the intake manifold pressure; and,
simultaneously controlling the mixture of fuel gas and air supplied to the prechambers.

2. An improved method of fuel control for a gaseous fueled internal combustion engine that includes a prechamber for each of a plurality of combustion chambers, an ignition system for igniting the fuel, and an intake manifold connected with each combustion chamber, the improved method comprising the steps of:
supplying fuel gas to the prechambers at a pressure not less than intake manifold pressure;
simultaneously supplying a fuel gas and air mixture to the combustion chamber;
igniting the gas in said prechambers to ignite the gas and air mixture in said combustion chamber;
varying the pressure of fuel gas and air mixture supplied to said prechambers in accordance with the intake manifold pressure; and,
simultaneously controlling the mixture of fuel gas and air supplied to the prechambers.

3. An improved prechamber fuel system for a gaseous fueled engine including a prechamber for each of a plurality of cylinders; a reciprocating piston located in each cylinder; a head closing one end of each cylinder; said head, cylinders and pistons forming a plurality of combustion chambers; an intake manifold connected with each combustion chamber; a source of pressurized fuel gas; a source of combustion air; and, each said prechamber having ignition means therein, the improvement comprising:
a prechamber manifold connected with each prechamber;
conduit means connecting said prechamber manifold with the source of combustion air and with the source of pressurized fuel gas;
flow control means in said conduit means for controlling the ratio of fuel gas to air; and,
pressure control means in said conduit means for regulating the pressure of said fuel gas and air relative to the pressure in said inlet manifold.

4. An improved prechamber fuel system for a gaseous fueled engine including a prechamber foreach of a plurality of cylinders; a reciprocating piston located in each cylinder; a head closing one end of each cylinder; said head, cylinders and pistons forming a plurality of combustion chambers; an intake manifold connected with each combustion chamber; a source of pressurized fuel gas; a source of combustion air; and, each said prechamber having ignition means therein, the improvement comprising:

a prechamber manifold connected with each prechamber;

conduit means connecting said prechamber manifold with the source of combustion air and with the source of pressurized fuel gas, said conduit means including a fuel gas conduit connected with the source of pressurized fuel gas and an air conduit connected with the source of combustion air and with said fuel gas conduit;

flow control means in said conduit mean for controlling the ratio of fuel gas to air, said flow control means includes a flow control device located in each said conduit whereby the ratio of fuel gas to combustion air can be predetermined; and, pressure control means in said conduit means for regulating the pressure of said fuel gas and air relative to the pressure in said inlet manifold.

5. The fuel system of claim 4 wherein said pressure control means is located downstream of said flow control devices.

6. The fuel system of claim 4 wherein said pressure control means is located upstream of said flow control devices.

7. The fuel system of claim 6 wherein said pressure control means includes a pressure regulator located in each conduit and having sensing lines connected with said intake manifold.

8. An improved prechamber fuel system for a gaseous fueled engine including a prechamber for each of a plurality of cylinders; a reciprocating piston located in each cylinder; a head closing one end of each cylinder; said head, cylinders and pistons forming a plurality of combustion chambers; an intake manifold connected with each combustion chamber; a source of pressurized fuel gas; a source of combustion air; and, each said prechamber having ignition means therein, the improvement comprising:

a prechamber manifold connected with each prechamber;

conduit means connecting said prechamber manifold with the source of combustion air and with the source of pressurized fuel gas, said conduit means including an air conduit connected with the source of combustion air, a fuel gas conduit connected with the source of pressurized fuel gas, and a connecting conduit extending from said prechamber manifold to said fuel gas and air conduits;

flow control means in said conduit means for controlling the ratio of fuel gas to air, said flow control means including a flow control device located in each said conduit whereby the ratio of fuel gas to combustion air can be predetermined; and, pressure control means in said conduit means for regulating the pressure of said fuel gas and air relative to the pressure in said intake manifold, said pressure control means including a pressure regulator in said connecting conduit having a sensing line connected with said intake manifold, whereby the pressure in said connecting conduit varies with the pressure in said intake manifold.

9. The fuel system of claim 8 wherein:

said conduit means also includes a second fuel gas conduit extending from the source of fuel gas to said connecting conduit downstream of said pressure regulator; and, said pressure control means also includes a second pressure regulator located in said second fuel gas conduit and having a sensing line connected to said intake manifold, 10. The fuel system of claim 9 wherein said regulators are set to deliver pressure at least equal to the pressure in said intake manifold and said first regulator is set to deliver a higher pressure than said second regulator.

* * * * *